United States Patent
Goren et al.

(10) Patent No.: US 11,688,070 B2
(45) Date of Patent: Jun. 27, 2023

(54) VIDEO FRAME SEGMENTATION USING REDUCED RESOLUTION NEURAL NETWORK AND MASKS FROM PREVIOUS FRAMES

(71) Applicant: INTEL CORPORATION, Santa Clara, CA (US)

(72) Inventors: Amir Goren, Be'er Ya'akov (IL); Noam Elron, Tel Aviv (IL); Noam Levy, Karmiel (IL)

(73) Assignee: Intel Corporation, Santa Clara, CA (US)

( * ) Notice: Subject to any disclaimer, the term of this patent is extended or adjusted under 35 U.S.C. 154(b) by 0 days.

(21) Appl. No.: 16/911,937

(22) Filed: Jun. 25, 2020

(65) Prior Publication Data
US 2020/0327334 A1 Oct. 15, 2020

(51) Int. Cl.
*G06T 7/11* (2017.01)
*G06T 3/40* (2006.01)
*G06T 7/194* (2017.01)
*G06N 3/02* (2006.01)
*G06T 5/00* (2006.01)
*G06V 20/40* (2022.01)
*G06V 40/16* (2022.01)
*G06F 18/214* (2023.01)
*G06V 10/82* (2022.01)
*G06V 10/44* (2022.01)
*G06V 10/26* (2022.01)

(52) U.S. Cl.
CPC .............. *G06T 7/11* (2017.01); *G06F 18/214* (2023.01); *G06N 3/02* (2013.01); *G06T 3/4046* (2013.01); *G06T 5/002* (2013.01); *G06T 7/194* (2017.01); *G06V 10/26* (2022.01); *G06V 10/454* (2022.01); *G06V 10/82* (2022.01); *G06V 20/40* (2022.01); *G06V 20/49* (2022.01); *G06V 40/165* (2022.01); *G06T 2207/10016* (2013.01); *G06T 2207/20081* (2013.01); *G06T 2207/20084* (2013.01); *G06V 40/161* (2022.01)

(58) Field of Classification Search
CPC ...... G06V 20/49; G06V 40/165; G06T 7/194; G06T 3/4046; G06T 5/002; G06T 2207/10016; G06T 2207/20081; G06T 2207/20084; G06K 9/6256; G06N 3/02
USPC ........................................................ 382/156
See application file for complete search history.

(56) References Cited

U.S. PATENT DOCUMENTS

| | | | |
|---|---|---|---|
| 2017/0006211 A1* | 1/2017 | Gurbuz | H04N 5/23229 |
| 2017/0200067 A1* | 7/2017 | Zhou | G06V 10/443 |
| 2019/0311202 A1* | 10/2019 | Lee | G06K 9/627 |
| 2020/0160528 A1* | 5/2020 | Rhodes | G06V 20/49 |

(Continued)

OTHER PUBLICATIONS

Ronneberger, U-net: Convolutional Networks for Biomedical Image Segmentation, MICCAI 2015 (Year: 2015).*

*Primary Examiner* — Mark Roz
(74) *Attorney, Agent, or Firm* — Hanley, Flight & Zimmerman, LLC (57) ABSTRACT

An example apparatus for video frame segmentation includes a receiver to receive a current video frame to be segmented. The apparatus also includes a segmenting neural network to receive a previous mask including a segmentation mask corresponding to a previous frame and generate a segmentation mask for the current frame based on the previous mask and the video frame.

22 Claims, 8 Drawing Sheets

(56) References Cited

U.S. PATENT DOCUMENTS

2020/0218961 A1* 7/2020 Kanazawa ............. G06N 20/20
2020/0294243 A1* 9/2020 Li ........................... G06T 7/143

* cited by examiner

VIDEO FRAME SEGMENTATION USING REDUCED RESOLUTION NEURAL NETWORK AND MASKS FROM PREVIOUS FRAMES

BACKGROUND

In computer vision, image segmentation is the process of partitioning a digital image into multiple segments of sets of pixels, also known as image objects. For example, the goal of segmentation may be to simplify or change the representation of an image into a representation that is more meaningful and easier to analyze.

The same numbers are used throughout the disclosure and the figures to reference like components and features. Numbers in the 100 series refer to features originally found in FIG. 1; numbers in the 200 series refer to features originally found in FIG. 2; and so on.

DESCRIPTION OF THE EMBODIMENTS

In video conferencing settings, the background may be hidden or blurred to provide a better user experience of privacy in the call. To this end, the foreground versus the background of the video maybe segmented to indicate specific segments to be hidden or blurred. For example, segmentation may include precisely determining for each pixel of a video stream whether the pixel is part of a speaking person or not. This determination is sometimes performed using semantic segmentation. Semantic segmentation refers to generating a label for each pixel based on which object that the pixel is a part of. However, precisely segmenting the position of the person being photographed may be difficult. Moreover, some methods may consume a considerable amount of power and may thus greatly affect the hours of battery life (HOBL) of the devices implementing them. For example, some methods may use two to four watts of system power on a laptop or tablet, which indicates the use of a very computationally intensive algorithm.

In some examples, a deep neural network may be trained to provide the segmentation. Training may be done by introducing labeled images and using existing deep learning tools to optimize a loss function for the network inference. For example, the loss function may be a Cross-Entropy loss function. The network may thus be trained to output a label map of the same size as the image. In a foreground and background segmentation example, the label may be "0" for the background and "1" for the foreground.

Using this method, many convolutional neural network (CNN) topologies may allow this task to be performed given proper training. However, all these networks have millions of trainable parameters and may be very compute intensive. For example, these network topologies may use over 200 Giga arithmetic operations per second (GOPS) to process a 1920×1080×30 frame per second (FPS) stream.

The present disclosure relates generally to techniques for segmenting video frames. In particular, the techniques relate to semantic segmentation of video frames. Specifically, the techniques described herein include an apparatus, method and system for segmenting video frames using a reduced resolution neural network and masks from previous frames. An example apparatus includes a receiver to receive a current video frame to be segmented. The apparatus also includes a segmenting neural network to receive a previous mask corresponding to a previous frame and generate a segmentation mask for the current frame based on the segmentation mask of a previous frame and the video frame. In some examples, the apparatus further includes a downscaler to reduce the resolution of the video frame to generate a reduced resolution frame to be input into the trained neural network. The apparatus may also include a scaling neural network trained to upscale low segmentation resolution masks into a resolution of the received current video frame.

The techniques described herein enable optimization of user experience. For example, the resulting output segmentation may be robust to avoid making wrong segmentation decisions. The techniques described herein thus enable segmentation that is stable over time and works in real time. In addition, the techniques described herein enable video segmentation to run on mobile devices, such as a laptop or tablet, without choking computing system resources. For example, the reduced resolution network described herein may be two to three orders of magnitude smaller than other CNNs currently used to perform this task, while achieving the same quality result. As one example, a neural network with only 10,000-100,000 trainable parameters may be used rather than networks that use millions of parameters. The techniques described herein thus allow implementation in real time with significantly lower power impact and hence higher HOBL. For example, the techniques described herein when used together may reduce the compute cost to under five GOPS.

Figure 1:
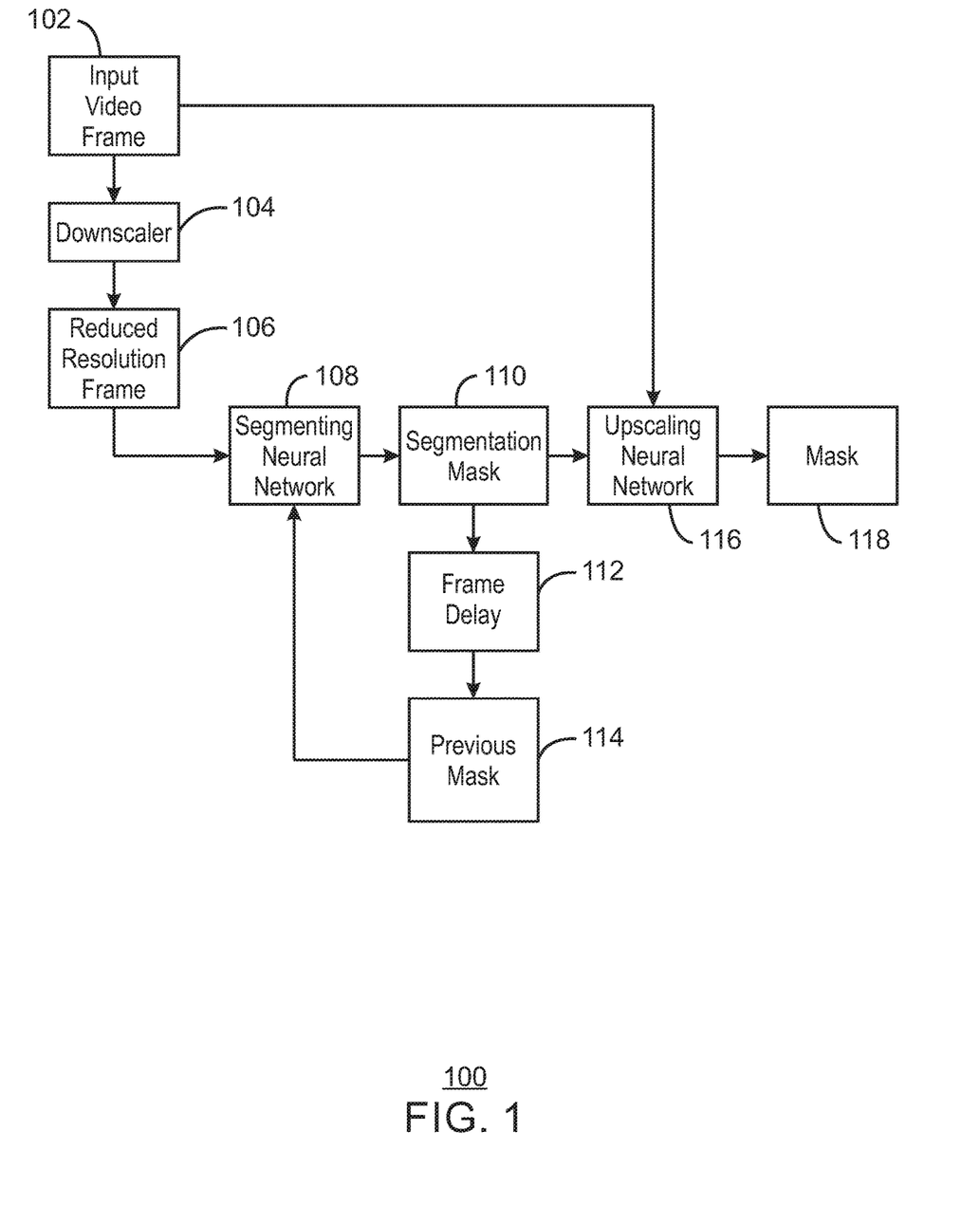
FIG. 1 is a block diagram illustrating an example system for segmenting video frames using a reduced resolution neural network and masks from previous frames.

FIG. 1 is a block diagram illustrating an example system for segmenting video frames using a reduced resolution neural network and masks from previous frames. The example system 100 can be implemented in the computing device 700 in FIG. 7 using the methods 400 and 500 of FIGS. 4 and 5.

The example system 100 includes an input image. For example, the input video frame may be a frame from a video stream. The system 100 includes a downscaler 104. For example, the downscaler 104 may reduce the resolution of input images. In the example of FIG. 1, the resulting reduced resolution may be an 8-bit 160×90 pixel RGB image 106. The system 100 further includes a segmenting network 108 communicatively coupled to the downscaler 104. For example, the segmenting neural network 108 may be reduced resolution neural network. As one example, the segmenting neural network 108 may be a SegNET deep fully convolutional neural network having 10,000-100,000 parameters trained to perform semantic pixel-wise segmentation on reduced resolution input. In various examples, the segmenting neural network 108 may be trained to process 160×90 pixel input. The system 100 also includes a segmentation mask 110 generated by the segmenting neural network 108. For example, the segmentation mask 110 may be a reduced resolution mask, such as an 8-bit 160×90 pixel mask. The system 100 also further includes a frame delay 112. For example, the frame delay 112 may be used to delay the transmission of the segmentation mask 110 by the duration of one frame such that the segmentation mask 110 is sent as a previous mask 114 to the segmenting neural network 108 as the segmenting neural network 108 receives a subsequent video frame as an input video frame 102. The system 100 also includes an upscaling neural network 116 communicatively coupled to the segmenting neural network 108. For example, the upscaling neural network 116 may be implemented using the ScaleNET neural network, first released in November 1998. As one example, the upscaling neural network 116 may have 1,000 parameters trained to upscale reduced resolution segmentation masks 110. The system 100 further includes a mask 118 generated by the upscaling neural network 116. For example, the mask 118 may have a resolution that is the same resolution of the input video frame 102.

The system 100 of FIG. 1 may be used to efficiently generate a segmentation mask 118 based on an input video frame 102 as well as a previous mask 114 generated for a previous frame. Segmentation may be divided into two tasks. In the first task, a semantic segmentation of each region may be performed using a greatly reduced resolution image. In the second task, the resulting label mask is upscaled to the original resolution.

The first task, segmentation may be more technically difficult. For example, segmentation in real-time may generally use more computing resources. However, the segmentation task may be executed on a reduced resolution frame 106 such that the network effective receptive field is enlarged with the same number of pixels encompassing a larger portion of the scene. The use of reduced resolution frame 106 may enable the use of a smaller sized segmenting neural network 108 with less parameters. This reduced network size of the segmenting neural network 108 allows for an order of magnitude reduction in inference complexity.

The second task of upscaling the mask to the original resolution is performed by the upscaling neural network 116. For example, the upscaling neural network 116 may be trained to learn to align the upscaled mask to fine-grain details in the full resolution image to generate an upscaled mask 118 at inference. Inference, as used herein, refers to a stage after training in which the trained upscaling neural network 116 is used to segment video feeds.

In various examples, in order to reduce complexity up to two to three orders of magnitude in total, the system 100 may also utilize temporal consistency in video. For example, an assumption may be made that between consecutive frames, the segmentation result changes very little, if at all, and this may also apply to many use cases where a video camera is relatively static. Building on this assumption, the previous mask 114 from the previous frame may be used as another channel into the segmentation network.

In some examples, an additional prior (not shown) may also be used as input into the segmenting neural network during training. As one example, in the context of background segmentation in a video call, an additional prior that may be used as input to segmenting neural network 108 is the output of a face detector (not shown). For example, the output of the face detector may be specifically a convex hull of detected face landmarks. In some examples, a facial cue layer may be used for faster training convergence. At inference, the previous mask 114, which already contains sufficient information of the salient object localization, may be used as prior instead of the facial cue. The use of facial cues for training is described in greater detail with respect to FIG. 3. In various examples, any other suitable cues may be used for training.

The diagram of FIG. 1 is not intended to indicate that the example system 100 is to include all of the components shown in FIG. 1. Rather, the example system 100 can be implemented using fewer or additional components not illustrated in FIG. 1 (e.g., additional input frames, neural networks, downscalers, upscaling networks, output masks, etc.). For instance, in some examples, the system 100 may not include the downscaler 104 and the upscaling neural network 116. For example, the segmenting neural network 108 may be trained to segment full resolution images and generate mask 118 using previous masks 114 in full resolution.

Figure 2:
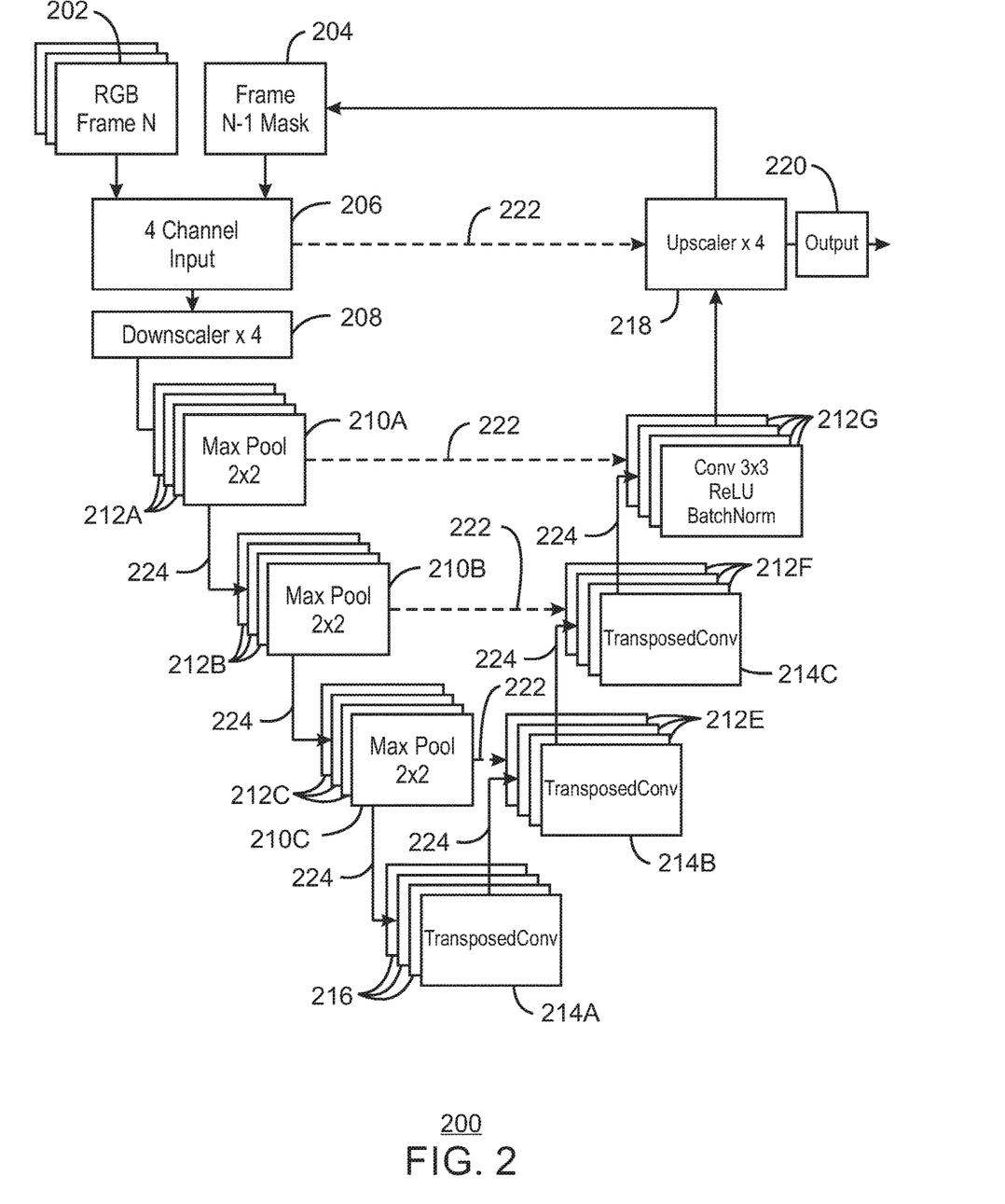
FIG. 2 is an example U-Net convolutional neural network (CNN) topology trained to generate segmentation masks using previous masks as input.

FIG. 2 is an example U-Net convolutional neural network (CNN) topology trained to generate segmentation masks using previous masks as input. The example U-Net CNN topology 200 can be implemented in the system 100, and trained using the process 300 or the method 500.

The example U-Net CNN topology 200 of FIG. 2 includes four input channels, including three channels corresponding to an RGB frame 202 and a previous mask 204. The RGB frame 202 and previous mask 204 are shown being received at a four channel input 206. The U-Net CNN topology 200 also includes a downscaler 208 communicatively coupled to the four channel input FHD 206. For example, the downscaler 208 can downscale the input channels by a factor of four. The U-Net CNN topology 200 also includes a number of coupled max pool layers 210A, 210B, 210C that are communicatively coupled to each other and the downscaler 208. The U-Net CNN topology 200 includes a number of convolutional layers 212A, 212B, 212C, 212D, 212E, 212F, and 212G communicatively coupled to each other and the 210A, 210B, 210C. In various examples, each of the convolutional layers 212A, 212B, 212C, 212D, 212E, 212F, and 212G may include a rectifying linear unit (ReLU) with batch normalization. The U-Net CNN topology 200 also includes a set of transposed convolutional layers 214A, 214B, and 214C communicatively coupled to the max pool layer 210C and the convolutional layers 212E, 212F, and 212G. The U-Net CNN topology 200 includes a set of atrous convolutional layers 216 communicatively coupled to the max pool layer 210C and the transposed convolutional layer 214A. The U-Net CNN topology 200 includes an upscaler 218 communicatively coupled to the convolutional rectifying linear unit (ReLU) with batch normalization 222 and the four channel input FHD 206. The upscaler 218 is shown generating an output 220. For example, the output 220 may be a segmentation mask with a resolution that matches the input RGB frame 202. The U-Net CNN topology 200 further includes dashed line arrows indicating skip connections 222 and solid lines indicating regular forward connections 224.

In the example U-Net CNN topology 200 of FIG. 2, a number of filters in convolutional blocks of a U-Net CNN may be removed to reduce unnecessary depth dimensions and to focus the Net CNN topology 200 on the size of the receptive field network able to gain. For example, a downscaler 208 may downscale the input channels by a factor of four. The U-Net CNN topology 200 includes an expansive path of encoder blocks and a contracting path of decoder blocks, which gives the U-Net CNN topology 200 a u-shaped architecture. For example, the contracting path begins with convolutional layers 212A and ends with atrous convolutional layers 216. The expansive path begins with transposed convolutional layer 214A and ends with the convolutional layers 212G. In various examples, the contracting path is a convolutional network that consists of repeated application of convolutions. In various examples, each of the convolutions may be followed by an activation unit, such as a rectified linear unit (ReLU), and a max pooling operation. During the contraction, the spatial information is reduced while feature information is increased. The expansive pathway combines the feature and spatial information through a sequence of up-convolutions and concatenations with high-resolution features from the contracting path.

In various examples, three layers of 3×3 convolutions 212A with ReLU and batch normalization may process the downscaled frames. The processed frames may then be processed by the max pooling of size 2×2 to down-sample the processed input by a factor of two. For example, the max pooling may include a sample-based discretization process that is to down-sample an input representation and reduce its dimensionality and allowing for assumptions to be made about features contained in the sub-regions binned. The 3×3 convolutions 2128 and 212C may similarly process downsampled output of max poolings 212A and 2128. A third max pooling 210C may similarly down-sample the output of 3×3 convolution 212C.

The final decoder block may include atrous convolutional layers 216 that may perform similarly to other encoder layers expect that the convolutions used may be atrous to enlarge the receptive field of the network more. In particular, atrous convolution is used to explicitly control the resolution at which feature responses are computed within the U-Net CNN topology 200 and to effectively enlarge the field of view of filters to incorporate larger context without increasing the number of parameters or the amount of computation. The output feature map of the atrous convolutional layers 216 may be larger to enlarge the field of view of filters to incorporate larger context. In some examples, the atrous convolutional layers 216 may perform an atrous spatial pyramid pooling (ASPP). In SPPs, multiple pooling layers may be used with different scales at the transition of convolution layer and fully-connected (FC) layer. In ASPP, parallel atrous convolutions with different rates may be applied in the input feature map, and fused together. In particular, ASPP probes an incoming convolutional feature layer with filters at multiple sampling rates and effective fields-of-views, thus capturing objects as well as image context at multiple scales.

Like the decoder blocks of convolutional layers 212A, 2128, 212C with corresponding max poolings 210A, 2108, 210C, the encoder blocks have a corresponding final layer after a set of convolutional layers 212E and 212F. However, the transposed convolutional layers 214A, 214B, and 214C may instead up-sample the input support by a factor of two in each step. In various examples, the transposed convolutional layers 214A, 214B, and 214C also propagate decisions made at the decoder blocks spatially with information from a same resolution from skip connections 222.

The upscaler 218 may upscale the feature maps received from the convolutional layers 212G to restore fine grained details. For example, the feature maps may be upscaled by a factor of four.

Figure 3:
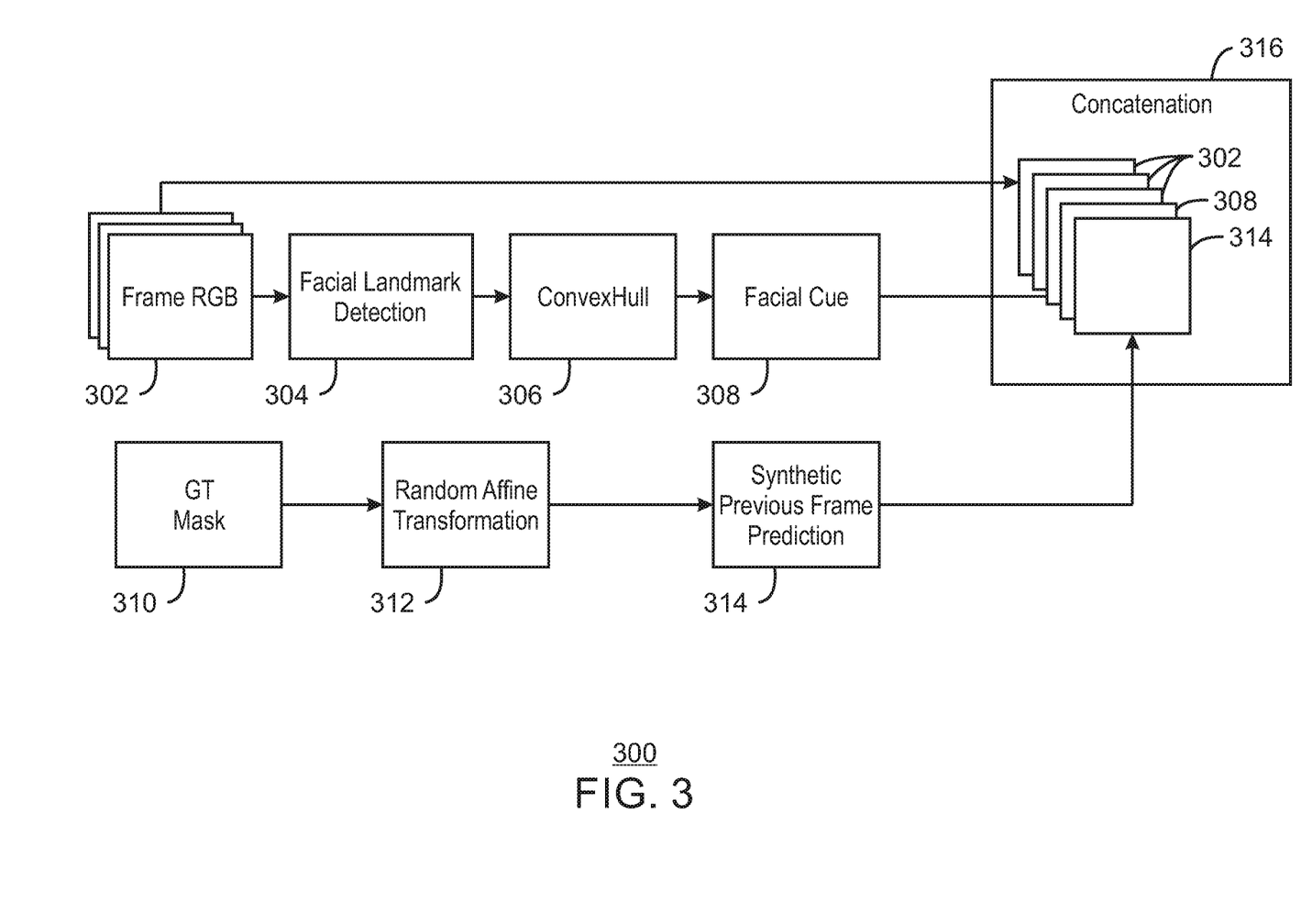
FIG. 3 is a flow chart illustrating an example process for generating training input used to train a neural network to segment video frames using masks from previous frames.

FIG. 3 is a flow chart illustrating an example process for generating training input used to train a neural network to segment video frames using masks from previous frames. The example process 300 can be implemented in the system 600 of FIG. 600 and used to train the segmenting neural network 108 of FIG. 1 or the neural network 200 of FIG. 2. In various examples, the process 300 may be implemented using the processor 602 of the computing device 600 of FIG. 6, or the processor 702 and trainer module 716 of computer readable media 700 of FIG. 7.

At block 302, an RGB video frame is received. For example, the video frame may include a red (R) channel, a green (G) channel, and a blue (B) channel corresponding to light levels detected by a sensor.

At block 304, a facial landmark detection is performed. The result of the facial landmark detection may generate a convex hull 306 containing a facial landmark. The convex hull 306 of a facial landmark is the smallest convex set that contains the facial landmark. In various examples, the convex-hull may be generated using a computer vision technique offline with a pretrained model that predicts facial landmarks.

At block 308, the facial landmark is used as a facial cue. For example, the facial cue may be a facial mask that is another channel passed to the network during training. In various examples, the facial cue may be a mask of the most area of the face and used as a location cue. For example, the facial cue may be optionally included to provide the neural network an additional cue as to where a salient object is located in a training image.

At block 310, a ground truth (GT) mask is received. For example, the GT mask may provide a correct segmentation for the video frame received at block 302.

At block 312, a random affine transformation is executed. For example, the random affine transformation may include a randomization of transformation parameters such as, translation range, rotation and shearing, and applying the affine transformation on the ground truth mask. The random affine transformation may be used to force the network to learn to adapt and leverage previous frame information when used during inference of a current frame. Since most of the available datasets used for training semantic segmentation may be based on still images, the GT mask 310 may be modified using the random affine transformation to generate a synthetic previous frame feedback during training in the form of a synthetic previous frame prediction 314. In various examples, other random transformations may be alternatively or additionally used. For example, the random transformations may include affine, projective or non-linear, or random classification noise. For example, random classification noise may modify random regions of a mask from 0 to 1 or from 1 to 0.

At block 316, the RGB frame 302, the facial cue 308, and the synthetic previous frame prediction 314 are concatenated. For example, the concatenation may be used at training input for training a neural network, such as the segmenting neural network 108 of FIG. 1 or a neural network using the U-Net CNN topology 200 of FIG. 2.

This process flow diagram is not intended to indicate that the blocks of the example process 300 are to be executed in any particular order, or that all of the blocks are to be included in every case. Further, any number of additional blocks not shown may be included within the example process 300, depending on the details of the specific implementation.

Figure 4:
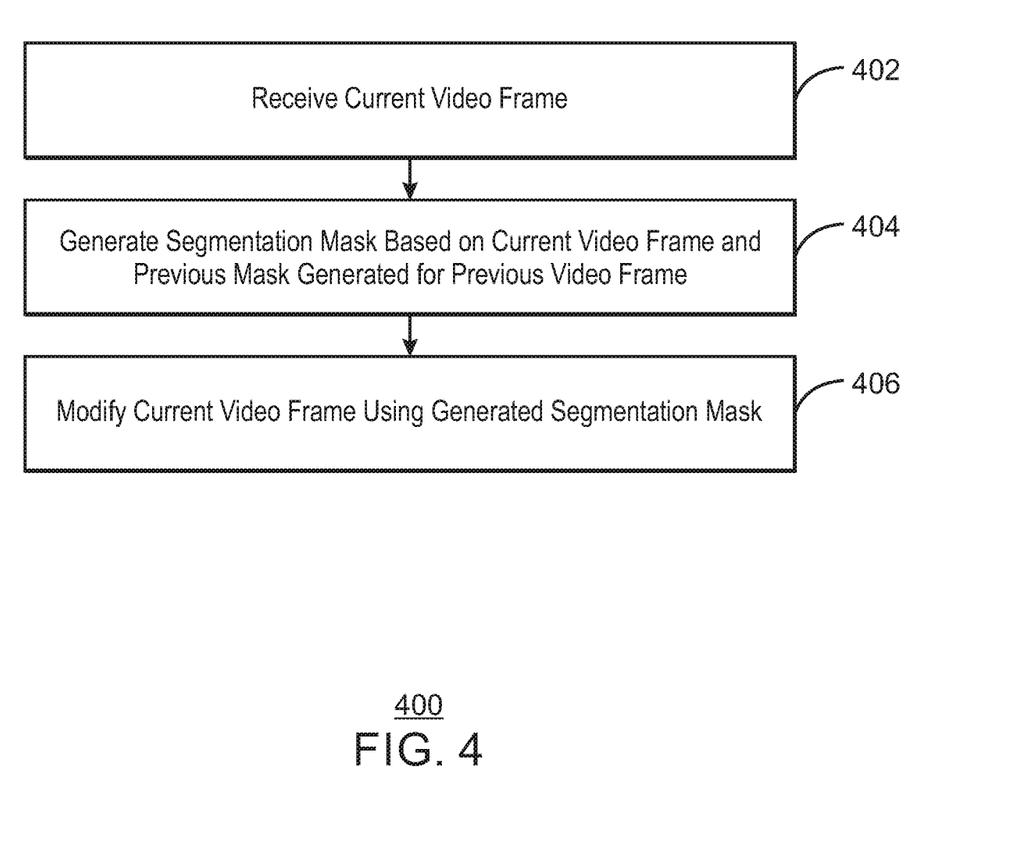
FIG. 4 is a flow chart illustrating a method for segmenting video frames using downscaling of input frames.

FIG. 4 is a flow chart illustrating a method for segmenting video frames using masks from previous frames. The example method 400 can be implemented in the system 100 of FIG. 1 or the system 600 of FIG. 600, using the neural network 200 of FIG. 2. In various examples, the method 400 may be implemented using the processor 602 of the computing device 600 of FIG. 6, or the processor 702 of computer readable media 700 of FIG. 7.

At block 402, current video frame is received. For example, the current video frame may be a frame of a streaming video. As one example, the streaming video may be a video of a streaming conference meeting.

At block 404, a segmentation mask is generated based on the current video frame and a previous mask generated for a previous video frame. For example, the segmentation mask may be generated via a trained segmenting network.

At block 406, the current video frame is modified using the generated segmentation mask. For example, a background of the video frame may be replaced with an input replacement background image. In some examples, a background of the video frame may be blurred.

This process flow diagram is not intended to indicate that the blocks of the example method 400 are to be executed in any particular order, or that all of the blocks are to be included in every case. Further, any number of additional blocks not shown may be included within the example method 400, depending on the details of the specific implementation.

Figure 5:
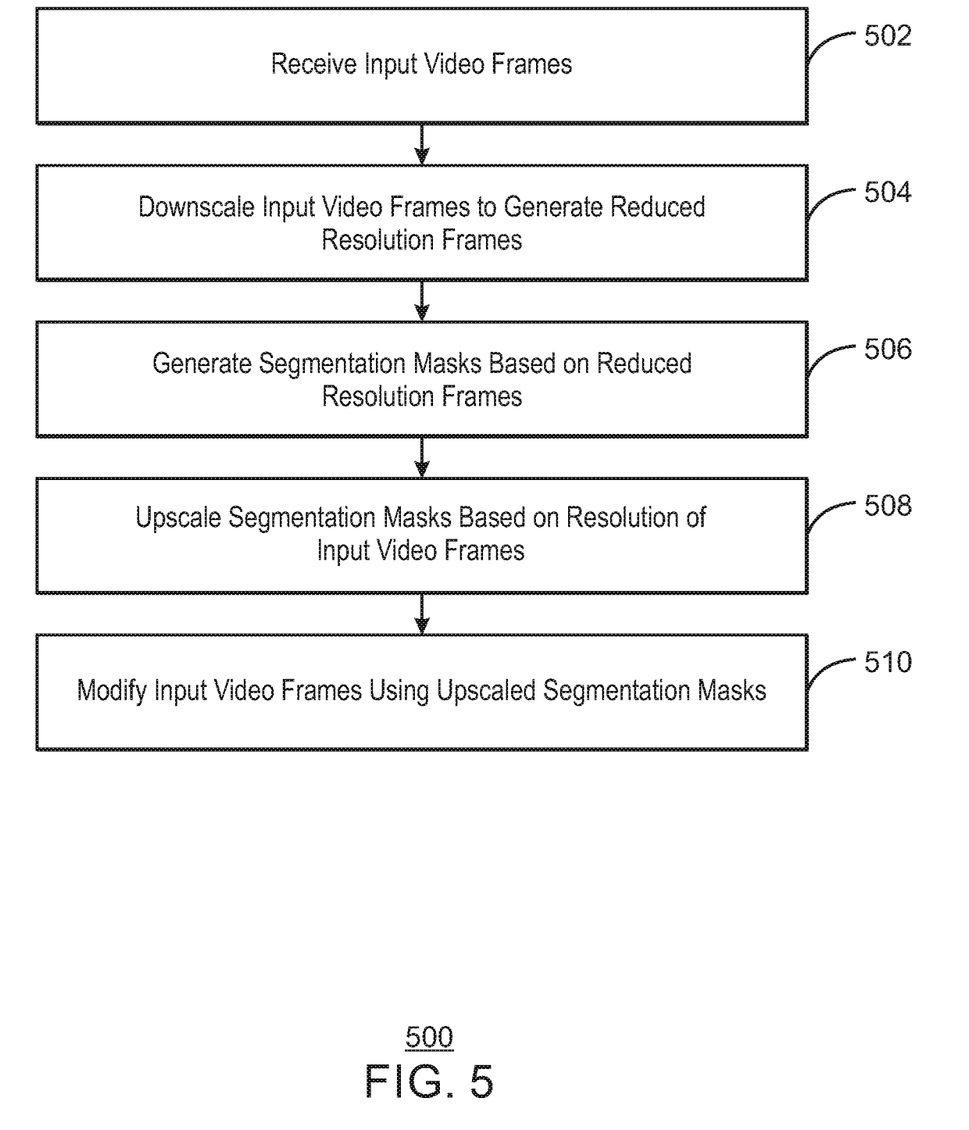
FIG. 5 is a flow chart illustrating a method for segmenting video frames using masks from previous frames.

FIG. 5 is a flow chart illustrating a method for segmenting video frames using masks from a previous frames. The example method 500 can be implemented in the system 100 of FIG. 1 or the system 600 of FIG. 600, using the neural network 200 of FIG. 2. In various examples, the method 500 may be implemented using the processor 602 of the computing device 600 of FIG. 6, or the processor 702 of computer readable media 700 of FIG. 7.

At block 502, input video frames are received. For example, the video frame may be a high resolution frame of a video stream.

At block 504, the input video frames are downscaled to generate a reduced resolution frame. For example, each frame may be downscaled by a factor of four, or any other suitable factor.

At block 506, segmentation masks are generated based on the reduced resolution frames. For example, a segmentation mask may be generated for each of the reduced resolution frames.

At block 508, the segmentation masks are upscaled based on a resolution of the input video frames. For example, each of the segmentation masks may be upscaled by a factor of four.

At block 510, the input video frames are modified based on the upscaled segmentation masks. For example, a background of each video frame may be replaced with an input replacement background image. In some examples, a background of each video frame may be blurred.

This process flow diagram is not intended to indicate that the blocks of the example method 500 are to be executed in any particular order, or that all of the blocks are to be included in every case. Further, any number of additional blocks not shown may be included within the example method 500, depending on the details of the specific implementation.

Figure 6:
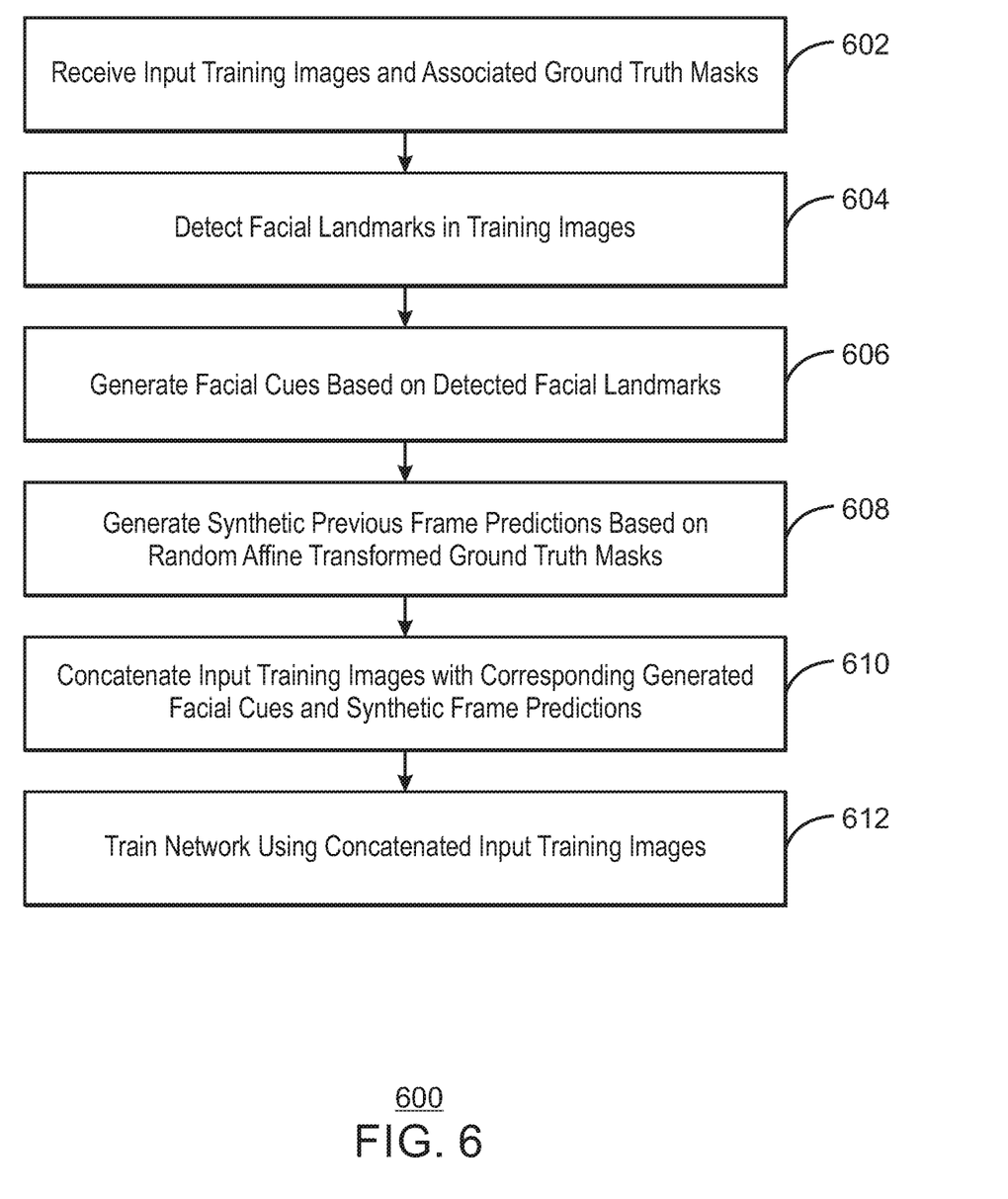
FIG. 6 is a flow chart illustrating a method for training a neural network to segment video frames using masks from previous frames.

FIG. 6 is a flow chart illustrating a method for training a neural network to segment video frames using masks from previous frames. The example method 600 can be implemented in the system 600 of FIG. 600 and used to train the segmenting neural network 108 of FIG. 1 or the neural network 200 of FIG. 2. In various examples, the method 600 may be implemented using the processor 602 of the computing device 600 of FIG. 6, or the processor 702 and trainer module 716 of computer readable media 700 of FIG. 7.

At block 602, input training images and associated ground truth masks are received. For example, the ground truth masks may be segmentation masks indicating a background and foreground. In some examples, the ground truth masks may indicate or one or more objects in the input training images.

At block 604, facial landmarks are detected in the training images. For example, the facial landmarks may be detected using any suitable facial landmark detector.

At block 606, facial cues are generated based on the detected facial landmarks. For example, a convex hull may be generated based on the detected facial landmarks. The convex hull may be used as a facial cue.

At block 608, synthetic previous frame predictions are generated based on random affine transformed ground truth masks. For example, a synthetic previous frame prediction may be generated for each ground truth masks using a random affine transformation.

At block 610, the input training images are concatenated with corresponding generated facial cues and synthetic frame predictions. For example, each input training image may be concatenated with a corresponding generated facial cue and synthetic frame prediction.

At block 612, a network is trained using the concatenated input training images. For example, the network may be a convolutional neural network (CNN), such as the U-Net CNN topology 200 of FIG. 2.

This process flow diagram is not intended to indicate that the blocks of the example method 600 are to be executed in any particular order, or that all of the blocks are to be included in every case. Further, any number of additional blocks not shown may be included within the example method 600, depending on the details of the specific implementation.

Figure 7:
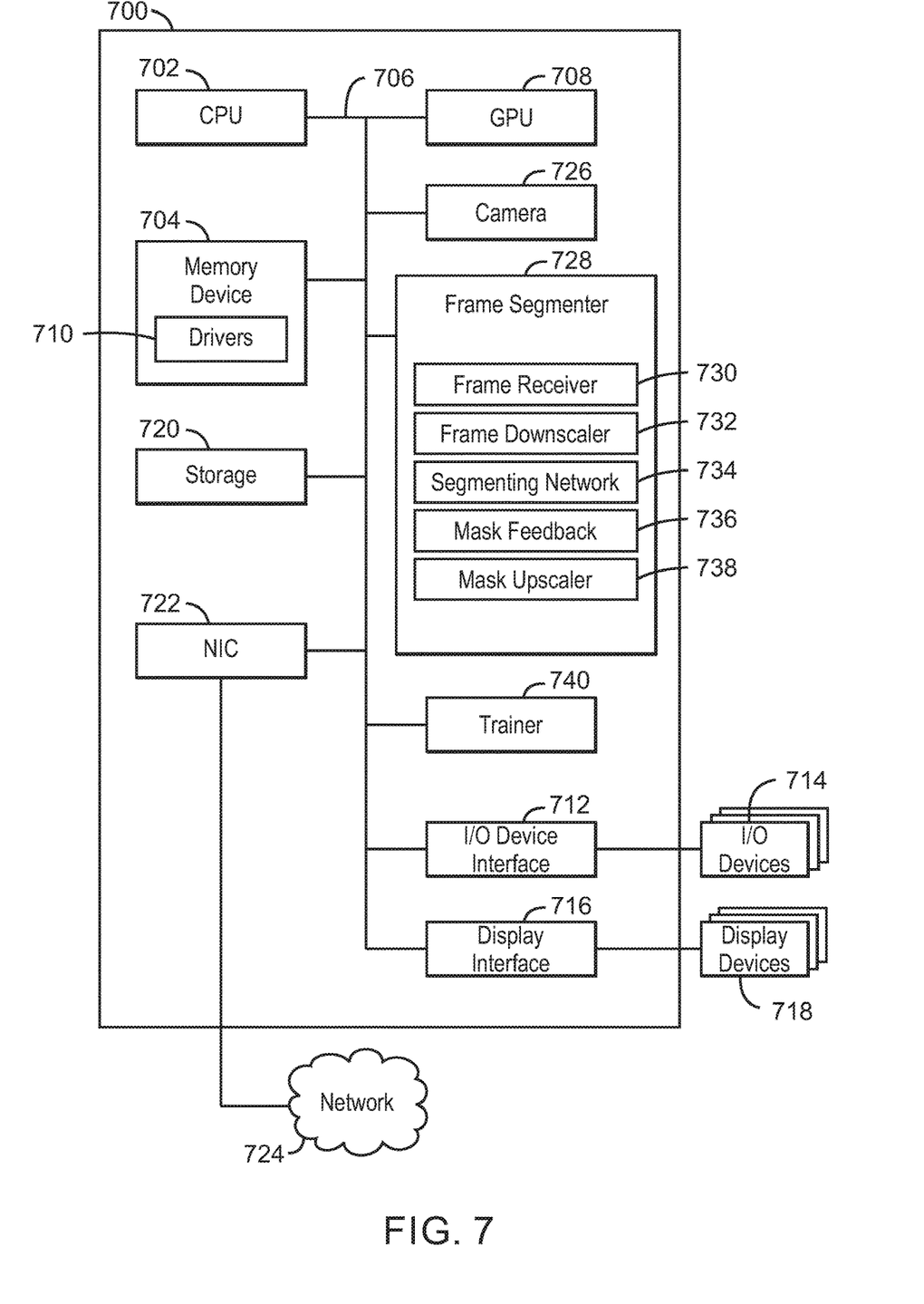
FIG. 7 is block diagram illustrating an example computing device that can segment video frames using a reduced resolution neural network and masks from previous frames.

Referring now to FIG. 7, a block diagram is shown illustrating an example computing device that can segment video frames using a reduced resolution neural network and masks from previous frames. The computing device 700 may be, for example, a laptop computer, desktop computer, tablet computer, mobile device, or wearable device, among others. In some examples, the computing device 700 may be a teleconferencing device. The computing device 700 may include a central processing unit (CPU) 702 that is configured to execute stored instructions, as well as a memory device 704 that stores instructions that are executable by the CPU 702. The CPU 702 may be coupled to the memory device 704 by a bus 706. Additionally, the CPU 702 can be a single core processor, a multi-core processor, a computing cluster, or any number of other configurations. Furthermore, the computing device 700 may include more than one CPU 702. In some examples, the CPU 702 may be a system-on-chip (SoC) with a multi-core processor architecture. In some examples, the CPU 702 can be a specialized digital signal processor (DSP) used for image processing. The memory device 704 can include random access memory (RAM), read only memory (ROM), flash memory, or any other suitable memory systems. For example, the memory device 704 may include dynamic random access memory (DRAM).

The memory device 704 can include random access memory (RAM), read only memory (ROM), flash memory, or any other suitable memory systems. For example, the memory device 704 may include dynamic random access memory (DRAM).

The computing device 700 may also include a graphics processing unit (GPU) 708. As shown, the CPU 702 may be coupled through the bus 706 to the GPU 708. The GPU 708 may be configured to perform any number of graphics operations within the computing device 700. For example, the GPU 708 may be configured to render or manipulate graphics images, graphics frames, videos, or the like, to be displayed to a user of the computing device 700.

The memory device 704 can include random access memory (RAM), read only memory (ROM), flash memory, or any other suitable memory systems. For example, the memory device 704 may include dynamic random access memory (DRAM). The memory device 704 may include device drivers 710 that are configured to execute the instructions for training multiple convolutional neural networks to perform sequence independent processing. The device drivers 710 may be software, an application program, application code, or the like.

The CPU 702 may also be connected through the bus 706 to an input/output (I/O) device interface 712 configured to connect the computing device 700 to one or more I/O devices 714. The I/O devices 714 may include, for example, a keyboard and a pointing device, wherein the pointing device may include a touchpad or a touchscreen, among others. The I/O devices 714 may be built-in components of the computing device 700, or may be devices that are externally connected to the computing device 700. In some examples, the memory 704 may be communicatively coupled to I/O devices 714 through direct memory access (DMA).

The CPU 702 may also be linked through the bus 706 to a display interface 716 configured to connect the computing device 700 to a display device 718. The display device 718 may include a display screen that is a built-in component of the computing device 700. The display device 718 may also include a computer monitor, television, or projector, among others, that is internal to or externally connected to the computing device 700.

The computing device 700 also includes a storage device 720. The storage device 720 is a physical memory such as a hard drive, an optical drive, a thumbdrive, an array of drives, a solid-state drive, or any combinations thereof. The storage device 720 may also include remote storage drives.

The computing device 700 may also include a network interface controller (NIC) 722. The NIC 722 may be configured to connect the computing device 700 through the bus 706 to a network 724. The network 724 may be a wide area network (WAN), local area network (LAN), or the Internet, among others. In some examples, the device may communicate with other devices through a wireless technology. For example, the device may communicate with other devices via a wireless local area network connection. In some examples, the device may connect and communicate with other devices via Bluetooth® or similar technology.

The computing device 700 further includes a camera 726. For example, the camera 726 may include one or more imaging sensors. In some example, the camera 726 may include a processor to generate video frames.

The computing device 700 further includes a frame segmenter 728. For example, the frame segmenter 728 can be used to segment video frames. The frame segmenter 728 can include a frame receiver 730, frame downscaler 732, a segmenting network 734, a mask feedback 736, and a mask upscaler 738. In some examples, each of the components 730-738 of the frame segmenter 728 may be a microcontroller, embedded processor, or software module. The frame receiver 730 can receive a video frame to be segmented. For example, the video frame may be a current video frame of a streaming video. The frame downscaler 732 can reduce the resolution of the video frame to generate a reduced resolution frame to be input into a segmenting neural network. For example, the segmenting neural network may be a reduced resolution neural network. In some examples, the frame downscaler 732 can downscale the frame by a factor of four. The segmenting network 734 can generate a segmentation mask for the current frame based on a previous mask and the video frame. In some examples, the segmentation mask may be a reduced resolution segmentation mask. In some examples, the segmenting network 734 can generate a segmentation mask for the video frame based on a reduced resolution frame and a reduced resolution segmentation mask. The mask feedback 736 can send the generated segmentation mask to the segmenting neural network after a delay to be used as the previous mask for a subsequent video frame. The mask upscaler 738 can upscale the segmentation mask based on a resolution of the video frame.

The computing device 700 further includes a trainer 740. For example, the trainer 740 can be used to train the segmenting network 734 and the mask upscaler 738. In various examples, the trainer 740 can receive input training images and associated ground truth mask. In some examples, the trainer 740 can train the segmenting network 734 using facial cues generated from detected facial landmarks in the training images. In various examples, the trainer 740 can train the segmenting network 734 using synthetic previous frame prediction. For example, the trainer 740 can generate the synthetic previous frame prediction using a random affine transformation of a ground truth mask. In various examples, the trainer 740 can train the segmenting network 734 using an additional cue. In some examples, the additional cue can be a facial cue generated from received detected facial landmarks. For example, the trainer 740 can train the segmenting network 734 using the process 300 of FIG. 3.

The block diagram of FIG. 7 is not intended to indicate that the computing device 700 is to include all of the components shown in FIG. 7. Rather, the computing device 700 can include fewer or additional components not illustrated in FIG. 7, such as additional buffers, additional processors, and the like. The computing device 700 may include any number of additional components not shown in FIG. 7, depending on the details of the specific implementation. For example, the computing device 700 can include a frame modifier to modify the video frame using the segmentation mask. For example, frame modifier can blur a background of the video frame using the upscaled segmentation mask. In some examples, the frame modifier can replace a background of the video frame using the upscaled segmentation mask with a replacement background image. Furthermore, any of the functionalities of the frame receiver 730, the frame downscaler 732, the segmenting network 734, the mask feedback 736, the mask upscaler 738, and the trainer 740, may be partially, or entirely, implemented in hardware and/or in the processor 702. For example, the functionality may be implemented with an application specific integrated circuit, in logic implemented in the processor 702, or in any other device. In addition, any of the functionalities of the CPU 702 may be partially, or entirely, implemented in hardware and/or in a processor. For example, the functionality of the frame segmenter 728 may be implemented with an application specific integrated circuit, in logic implemented in a processor, in logic implemented in a specialized graphics processing unit such as the GPU 708, or in any other device.

Figure 8:
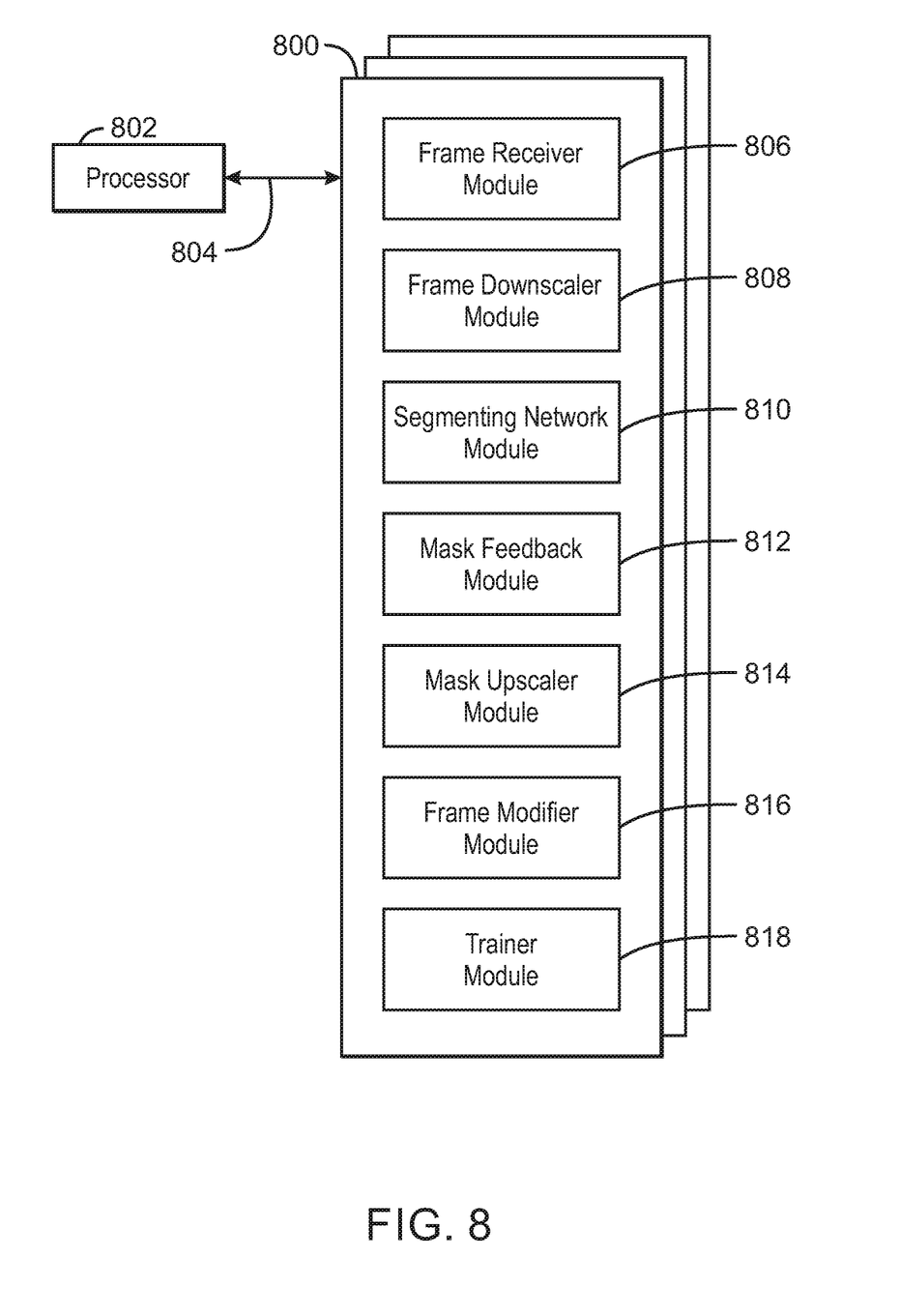
FIG. 8 is a block diagram showing computer readable media that store code for segmenting video frames using a reduced resolution neural network and masks from previous frames.

FIG. 8 is a block diagram showing computer readable media 800 that store code for segmenting video frames using a reduced resolution neural network and masks from previous frames. The computer readable media 800 may be accessed by a processor 802 over a computer bus 804. Furthermore, the computer readable medium 800 may include code configured to direct the processor 802 to perform the methods described herein. In some embodiments, the computer readable media 800 may be non-transitory computer readable media. In some examples, the computer readable media 800 may be storage media.

The various software components discussed herein may be stored on one or more computer readable media 800, as indicated in FIG. 8. For example, a frame receiver module 806 may be configured to receive a video frame to be segmented. For example, the video frame may be a current video frame of a video stream. A frame downscaler module 808 may be configured to downscale the video frame to generate a reduced resolution frame. For example, the frame downscaler module 808 may be configured to reduce the resolution of the video frame to generate a reduced resolution frame to be input into the segmenting neural network. A segmenting network module 810 may be configured to generate a segmentation mask for the current video frame based on the previous mask and the video frame. In some examples, the segmenting network module 810 may be configured to generate a segmentation mask for the current video frame based on a reduced resolution video frame. A mask feedback module 812 may be configured to send the generated segmentation mask to the segmenting neural network. For example, the mask feedback module 812 may be configured to send the generated segmentation mask to the segmenting neural network after a delay to be used as the previous mask for a subsequent video frame. A mask upscaler module 714 may be configured to upscale low segmentation resolution masks into a resolution of the received current video frame. A frame modifier module 716 may be configured to modify the current video frame based on the segmentation mask. In various examples, the frame modifier module 716 may be configured to modify the current video frame based on a segmentation mask that matches the resolution of the current video frame. For example, the frame modifier module 716 may be configured to replace a background of the current video frame with an input replacement background image or blur a background of the current video frame using the upscaled segmentation mask. A trainer module 718 may be configured to receive input training images and associated ground truth masks and train a segmenting network using synthetic previous frame predictions generated from ground truth masks. In some examples, the trainer module 718 may be configured to train the segmenting network using facial cues generated from detected facial landmarks in the training images.

The block diagram of FIG. 8 is not intended to indicate that the computer readable media 800 is to include all of the components shown in FIG. 8. Further, the computer readable media 800 may include any number of additional components not shown in FIG. 8, depending on the details of the specific implementation.

Examples

Example 1 is an apparatus for video frame segmentation. The apparatus includes a receiver to receive a current video frame to be segmented. The apparatus includes a segmenting neural network to receive a previous mask including a segmentation mask corresponding to a previous frame and generate a segmentation mask for the current video frame based on the previous mask and the video frame.

Example 2 includes the apparatus of example 1, including or excluding optional features. In this example, the apparatus includes a downscaler to reduce the resolution of the video frame to generate a reduced resolution frame to be input into the segmenting neural network. The segmenting neural network is a reduced resolution neural network.

Example 3 includes the apparatus of any one of examples 1 to 2, including or excluding optional features. In this example, the segmentation mask includes a reduced resolution segmentation mask.

Example 4 includes the apparatus of any one of examples 1 to 3, including or excluding optional features. In this example, the apparatus includes an upscaling neural network trained to upscale low segmentation resolution masks into a resolution of the received current video frame.

Example 5 includes the apparatus of any one of examples 1 to 4, including or excluding optional features. In this example, the apparatus includes a mask feedback to send the generated segmentation mask to the segmenting neural network after a delay to be used as the previous mask for a subsequent video frame.

Example 6 includes the apparatus of any one of examples 1 to 5, including or excluding optional features. In this example, the segmenting neural network includes a U-Net.

Example 7 includes the apparatus of any one of examples 1 to 6, including or excluding optional features. In this example, the neural network is trained using a random affine transformation of a ground truth mask.

Example 8 includes the apparatus of any one of examples 1 to 7, including or excluding optional features. In this example, the neural network is trained using a synthetic previous frame prediction.

Example 9 includes the apparatus of any one of examples 1 to 8, including or excluding optional features. In this example, the neural network is trained using an additional cue.

Example 10 includes the apparatus of any one of examples 1 to 9, including or excluding optional features. In this example, the neural network is trained using a facial cue.

Example 11 is a method for video segmentation. The method includes receiving, via a processor, an input video frame. The method also includes downscaling, via the processor, the input video frame to generate a reduced resolution frame. The method further includes generating, via a segmenting network, a segmentation mask based on the reduced resolution frame. The method also further includes upscaling, via an upscaling network, the segmentation mask based on a resolution of the input video frame. The method also includes modifying, via the processor, the input video frame based on the upscaled segmentation mask.

Example 12 includes the method of example 11, including or excluding optional features. In this example, the method includes training the segmenting network using input training images and associated ground truth masks.

Example 13 includes the method of any one of examples 11 to 12, including or excluding optional features. In this example, the method includes training the segmenting network using facial cues generated from detected facial landmarks in the training images.

Example 14 includes the method of any one of examples 11 to 13, including or excluding optional features. In this example, the method includes training the segmenting network using synthetic previous frame predictions generated from random affine transformed ground truth masks.

Example 15 includes the method of any one of examples 11 to 14, including or excluding optional features. In this example, the method includes training the segmenting network using a concatenation of input training images, generated facial cues, and synthetic frame predictions.

Example 16 includes the method of any one of examples 11 to 15, including or excluding optional features. In this example, the method includes training the segmenting network using an additional cue.

Example 17 includes the method of any one of examples 11 to 16, including or excluding optional features. In this example, the method includes generating a synthetic previous frame prediction from a ground truth mask using a random affine transformation.

Example 18 includes the method of any one of examples 11 to 17, including or excluding optional features. In this example, downscaling the input video frame includes downscaling the frame by a factor of four.

Example 19 includes the method of any one of examples 11 to 18, including or excluding optional features. In this example, modifying the input video frame includes blurring a background of the input video frame using the upscaled segmentation mask.

Example 20 includes the method of any one of examples 11 to 19, including or excluding optional features. In this example, modifying the input video frame includes replacing a background of the input video frame using the upscaled segmentation mask with a replacement background image.

Example 21 is at least one computer readable medium for segmenting video having instructions stored therein that direct the processor to receive a current video frame to be segmented. The computer-readable medium includes instructions that direct the processor to receive a previous mask including a segmentation mask corresponding to a previous frame. The computer-readable medium also includes instructions that direct the processor to generate a segmentation mask for the current video frame based on the previous mask and the video frame. The computer-readable medium further includes instructions that direct the processor to modify the current video frame based on the segmentation mask.

Example 22 includes the computer-readable medium of example 21, including or excluding optional features. In this example, the computer-readable medium includes instructions to cause the processor to reduce the resolution of the video frame to generate a reduced resolution frame to be input into the segmenting neural network.

Example 23 includes the computer-readable medium of any one of examples 21 to 22, including or excluding optional features. In this example, the computer-readable medium includes instructions to cause the processor to upscale low segmentation resolution masks into a resolution of the received current video frame.

Example 24 includes the computer-readable medium of any one of examples 21 to 23, including or excluding optional features. In this example, the computer-readable medium includes instructions to cause the processor to send the generated segmentation mask to the segmenting neural network after a delay to be used as the previous mask for a subsequent video frame.

Example 25 includes the computer-readable medium of any one of examples 21 to 24, including or excluding optional features. In this example, the computer-readable medium includes instructions to cause the processor to replace a background of the current video frame with an input replacement background image or blur a background of the current video frame using the upscaled segmentation mask.

Example 26 includes the computer-readable medium of any one of examples 21 to 25, including or excluding optional features. In this example, the computer-readable medium includes instructions to train the segmenting network using an additional cue.

Example 27 includes the computer-readable medium of any one of examples 21 to 26, including or excluding optional features. In this example, the computer-readable medium includes instructions to generate a synthetic previous frame prediction from a ground truth mask using a random affine transformation.

Example 28 includes the computer-readable medium of any one of examples 21 to 27, including or excluding optional features. In this example, the computer-readable medium includes instructions to downscale the input video frame by a factor of four.

Example 29 includes the computer-readable medium of any one of examples 21 to 28, including or excluding optional features. In this example, the computer-readable medium includes instructions to blur a background of the input video frame using the upscaled segmentation mask.

Example 30 includes the computer-readable medium of any one of examples 21 to 29, including or excluding optional features. In this example, the computer-readable medium includes instructions to replace a background of the input video frame using the upscaled segmentation mask with a replacement background image.

Example 31 is a system for identification of three-dimensional points. The system includes means for receiving a current video frame to be segmented. The system also includes means for receiving a previous mask including a segmentation mask corresponding to a previous frame and generating a segmentation mask for the current video frame based on the previous mask and the video frame.

Example 32 includes the system of example 31, including or excluding optional features. In this example, the system includes means for reducing the resolution of the video frame to generate a reduced resolution frame to be input into the segmenting neural network. The means for generating the segmentation mask is a reduced resolution neural network.

Example 33 includes the system of any one of examples 31 to 32, including or excluding optional features. In this example, the segmentation mask includes a reduced resolution segmentation mask.

Example 34 includes the system of any one of examples 31 to 33, including or excluding optional features. In this example, the system includes means for upscaling low segmentation resolution masks into a resolution of the received current video frame.

Example 35 includes the system of any one of examples 31 to 34, including or excluding optional features. In this example, the system includes means for sending the generated segmentation mask to the segmenting neural network after a delay to be used as the previous mask for a subsequent video frame.

Example 36 includes the system of any one of examples 31 to 35, including or excluding optional features. In this example, the system includes tem of any combination of claims 31-35, where the means for means for generating the segmentation mask includes a U-Net.

Example 37 includes the system of any one of examples 31 to 36, including or excluding optional features. In this example, the means for generating the segmentation mask is trained using a random affine transformation of a ground truth mask.

Example 38 includes the system of any one of examples 31 to 37, including or excluding optional features. In this example, the means for generating the segmentation mask is trained using a synthetic previous frame prediction.

Example 39 includes the system of any one of examples 31 to 38, including or excluding optional features. In this example, the means for generating the segmentation mask is trained using an additional cue.

Example 40 includes the system of any one of examples 31 to 39, including or excluding optional features. In this example, the means for generating the segmentation mask is trained using a facial cue.

Example 41 is a system for video frame segmentation. The system includes a receiver to receive a current video frame to be segmented. The system also includes a segmenting neural network to receive a previous mask including a segmentation mask corresponding to a previous frame and generate a segmentation mask for the current video frame based on the previous mask and the video frame.

Example 42 includes the system of example 41, including or excluding optional features. In this example, the system includes a downscaler to reduce the resolution of the video frame to generate a reduced resolution frame to be input into the segmenting neural network. The segmenting neural network is a reduced resolution neural network.

Example 43 includes the system of any one of examples 41 to 42, including or excluding optional features. In this example, the segmentation mask includes a reduced resolution segmentation mask.

Example 44 includes the system of any one of examples 41 to 43, including or excluding optional features. In this example, the system includes an upscaling neural network trained to upscale low segmentation resolution masks into a resolution of the received current video frame.

Example 45 includes the system of any one of examples 41 to 44, including or excluding optional features. In this example, the system includes a mask feedback to send the generated segmentation mask to the segmenting neural network after a delay to be used as the previous mask for a subsequent video frame.

Example 46 includes the system of any one of examples 41 to 45, including or excluding optional features. In this example, the segmenting neural network includes a U-Net.

Example 47 includes the system of any one of examples 41 to 46, including or excluding optional features. In this example, the neural network is trained using a random affine transformation of a ground truth mask.

Example 48 includes the system of any one of examples 41 to 47, including or excluding optional features. In this example, the neural network is trained using a synthetic previous frame prediction.

Example 49 includes the system of any one of examples 41 to 48, including or excluding optional features. In this example, the neural network is trained using an additional cue.

Example 50 includes the system of any one of examples 41 to 49, including or excluding optional features. In this example, the neural network is trained using a facial cue.

Not all components, features, structures, characteristics, etc. described and illustrated herein need be included in a particular aspect or aspects. If the specification states a component, feature, structure, or characteristic "may", "might", "can" or "could" be included, for example, that particular component, feature, structure, or characteristic is not required to be included. If the specification or claim refers to "a" or "an" element, that does not mean there is only one of the element. If the specification or claims refer to "an additional" element, that does not preclude there being more than one of the additional element.

It is to be noted that, although some aspects have been described in reference to particular implementations, other implementations are possible according to some aspects. Additionally, the arrangement and/or order of circuit elements or other features illustrated in the drawings and/or described herein need not be arranged in the particular way illustrated and described. Many other arrangements are possible according to some aspects.

In each system shown in a figure, the elements in some cases may each have a same reference number or a different reference number to suggest that the elements represented could be different and/or similar. However, an element may be flexible enough to have different implementations and work with some or all of the systems shown or described herein. The various elements shown in the figures may be the same or different. Which one is referred to as a first element and which is called a second element is arbitrary.

It is to be understood that specifics in the aforementioned examples may be used anywhere in one or more aspects. For instance, all optional features of the computing device described above may also be implemented with respect to either of the methods or the computer-readable medium described herein. Furthermore, although flow diagrams and/or state diagrams may have been used herein to describe aspects, the techniques are not limited to those diagrams or to corresponding descriptions herein. For example, flow need not move through each illustrated box or state or in exactly the same order as illustrated and described herein.

The present techniques are not restricted to the particular details listed herein. Indeed, those skilled in the art having the benefit of this disclosure will appreciate that many other variations from the foregoing description and drawings may be made within the scope of the present techniques. Accordingly, it is the following claims including any amendments thereto that define the scope of the present techniques.

What is claimed is:

1. An apparatus for video frame segmentation, comprising:
   receiver circuitry to receive a current video frame to be segmented;
   downscaler circuitry to reduce a resolution of the current video frame to generate a reduced resolution frame;
   a segmenting neural network to:
      receive a previous mask including a first reduced resolution segmentation mask corresponding to a previous frame; and
      generate a second reduced resolution segmentation mask for the current video frame, the second reduced resolution segmentation mask based on the previous mask and the reduced resolution video frame;
   mask feedback circuitry to send the second reduced resolution segmentation mask to the segmenting neural network after a delay, the second reduced resolution segmentation mask to be used as the previous mask for a subsequent reduced resolution video frame, the delay corresponding to a video frame duration; and
   an upscaling neural network trained to upscale the second reduced resolution segmentation mask into a resolution of the current video frame.

2. The apparatus of claim 1, wherein the segmenting neural network includes a U-Net.

3. The apparatus of claim 1, wherein the segmenting neural network is trained using a random affine transformation of a ground truth mask.

4. The apparatus of claim 1, wherein the segmenting neural network is trained using a synthetic previous frame prediction.

5. The apparatus of claim 1, wherein the segmenting neural network is trained using an additional cue.

6. The apparatus of claim 1, wherein the segmenting neural network is trained using a facial cue.

7. At least one computer readable medium for segmenting video having instructions stored therein that, in response to being executed on a computing device, cause the computing device to:
   access a current video frame to be segmented;
   reduce a resolution of the current video frame to generate a reduced resolution frame;
   access a previous mask including a first reduced resolution segmentation mask corresponding to a previous frame;
   generate, via a segmenting neural network, a second reduced resolution segmentation mask for the current video frame, the second reduced resolution segmentation mask based on the previous mask and the reduced resolution video frame;
   send the second reduced resolution segmentation mask to the segmenting neural network after a delay, the second reduced resolution segmentation mask to be used as the previous mask for a subsequent reduced resolution video frame, the delay corresponding to a video frame duration;
   upscale, via an upscaling neural network, the second reduced resolution segmentation mask into a resolution of the current video frame; and
   modify the current video frame based on the upscaled second segmentation mask.

8. The at least one computer readable medium of claim 7, wherein the instructions, when executed, cause the computing device to (a) replace a background of the current video frame with an input replacement background image or (b) blur a background of the current video frame using the upscaled second segmentation mask.

9. An apparatus for video frame segmentation, comprising:
   memory;
   instructions; and
   processor circuitry to execute the instructions to:
      receive a current video frame to be segmented;
      reduce a resolution of the current video frame to generate a reduced resolution frame;
      receive a previous mask including a first reduced resolution segmentation mask corresponding to a previous frame;
      generate, via a segmenting neural network, a second reduced resolution segmentation mask for the current video frame, the second reduced resolution segmentation mask based on the previous mask and the reduced resolution video frame;
      send the second reduced resolution segmentation mask to the segmenting neural network after a delay, the second reduced resolution segmentation mask to be used as the previous mask for a subsequent reduced resolution video frame, the delay corresponding to a video frame duration; and
      upscale, via an upscaling neural network, the second reduced resolution segmentation mask into a resolution of the current video frame.

10. The apparatus of claim 9, wherein the segmenting neural network includes a U-Net.

11. The apparatus of claim 9, wherein the processor circuitry is to execute the instructions to train the segmenting neural network using a random affine transformation of a ground truth mask.

12. The apparatus of claim 9, wherein the processor circuitry is to execute the instructions to train the segmenting neural network using a synthetic previous frame prediction.

13. The apparatus of claim 9, wherein the processor circuitry is to execute the instructions to train the segmenting neural network using an additional cue.

14. The apparatus of claim 9, wherein the processor circuitry is to execute the instructions to train the segmenting neural network using a facial cue.

15. The apparatus of claim 1, further including training circuitry to train the segmenting neural network, the training circuitry to:
   access a training image and a ground truth mask corresponding to the training image;
   detect a facial landmark in the training image;
   generate a facial cue based on the facial landmark;
   modify the ground truth mask using a random transformation to generate a synthetic previous frame prediction; and
   concatenate the training image, the facial cue, and the synthetic previous frame prediction to be used as training input to the segmenting neural network.

16. The apparatus of claim 15, wherein the training circuitry is to generate a convex hull containing the facial landmark, the convex hull to be used as the facial cue.

17. The apparatus of claim 16, wherein the random transformation is an affine random transformation, a projective or non-linear random transformation, or random classification noise.

18. The apparatus of claim 1, further including a frame modifier circuitry to modify the current video frame using the upscaled second segmentation mask by (a) replacing a background of the current video frame with an input replacement background image or (b) blurring a background of the current video frame.

19. The apparatus of claim 9, wherein the processor circuitry is to train the segmenting neural network by:
   accessing a training image and a ground truth mask corresponding to the training image;
   detecting a facial landmark in the training image;
   generating a facial cue based on the facial landmark;
   modifying the ground truth mask using a random transformation to generate a synthetic previous frame prediction; and
   concatenating the training image, the facial cue, and the synthetic previous frame prediction to be used as training input to the segmenting neural network.

20. The apparatus of claim 19, wherein the processor circuitry is to generate a convex hull containing the facial landmark, the convex hull to be used as the facial cue.

21. The apparatus of claim 20, wherein the random transformation is an affine random transformation, a projective or non-linear random transformation, or random classification noise.

22. The apparatus of claim 9, wherein the processor circuitry is to modify the current video frame using the upscaled second segmentation mask by (a) replacing a background of the current video frame with an input replacement background image or (b) blurring a background of the current video frame.

\* \* \* \* \*